United States Patent
Pyle et al.

(10) Patent No.: US 10,215,892 B1
(45) Date of Patent: Feb. 26, 2019

(54) SHATTER RESISTANCE MIRROR

(71) Applicant: MCS Industries, Inc., Easton, PA (US)

(72) Inventors: Michael Lee Pyle, Sugar Grove, IL (US); Steven Patrick McGowan, Perkasie, PA (US)

(73) Assignee: MCS INDUSTRIES, INC.

( * ) Notice: Subject to any disclaimer, the term of this patent is extended or adjusted under 35 U.S.C. 154(b) by 0 days.

(21) Appl. No.: 15/351,019

(22) Filed: Nov. 14, 2016

Related U.S. Application Data

(60) Provisional application No. 62/254,352, filed on Nov. 12, 2015.

(51) Int. Cl.
*G02B 5/08* (2006.01)

(52) U.S. Cl.
CPC .................. *G02B 5/0808* (2013.01)

(58) Field of Classification Search
CPC .................................................. G02B 5/0808
USPC ....................................................... 359/870
See application file for complete search history.

(56) References Cited

U.S. PATENT DOCUMENTS

| | | | |
|---|---|---|---|
| 2,699,707 A * | 1/1955 | Bezborodko | G02B 7/182 29/520 |
| 3,094,430 A | 6/1963 | Skwierinski | |
| 4,232,075 A | 11/1980 | Gantz et al. | |
| 4,427,497 A * | 1/1984 | Heinz | B29D 11/00596 205/114 |
| 4,605,292 A | 8/1986 | McIntosh | |
| 5,208,704 A * | 5/1993 | Zito | G02B 5/08 359/848 |
| 6,045,231 A * | 4/2000 | Martineau | G02B 7/183 359/838 |
| 7,225,718 B1 * | 6/2007 | Grove | F41H 5/266 89/36.07 |
| 8,366,283 B2 | 2/2013 | Sierra | |
| 2011/0223372 A1 * | 9/2011 | Metz | B32B 1/00 428/80 |
| 2014/0293466 A1 * | 10/2014 | Von Kries | F24J 2/02 359/870 |
| 2016/0004033 A1 * | 1/2016 | McDonald | C03C 17/06 359/840 |

FOREIGN PATENT DOCUMENTS

| | | |
|---|---|---|
| EP | 0649039 | 4/1995 |
| WO | 2010138087 | 12/2010 |

* cited by examiner

*Primary Examiner* — Frank G Font
(74) *Attorney, Agent, or Firm* — Belles Katz LLC

(57) ABSTRACT

Described herein is a mirror apparatus comprising: a reflective substrate; and an anti-fog complex comprising: an adhesive layer atop the substrate; a first polymeric layer atop the pressure sensitive adhesive layer; and a second polymeric layer atop the first polymeric layer. Methods of making the mirror apparatus are also disclosed.

20 Claims, 4 Drawing Sheets

SHATTER RESISTANCE MIRROR

CROSS-REFERENCE TO RELATED APPLICATIONS

This application claims the benefit of U.S. Provisional Application No. 62/254,352, filed on Nov. 12, 2015. The disclosure of the above application is incorporated herein by reference.

FIELD OF THE DISCLOSURE

The present disclosure is directed to reflective surface coverings which are highly resistant to shattering, yet deliver acceptable functionality.

BACKGROUND

The mirror industry often employs glass mirror which have a propensity to shatter. To address this issue, manufacturers have used tape and/or glued-on dust covers. These "fixes", which may reduce the likelihood of shatter, often compromise functional attributes of the mirror, e.g. clarity, cleanability, etc.

Thus, there remains a need for reflective surface coverings which are shatter-resistant and do not compromise functionality. Some embodiments of the present invention are designed to meet these needs.

SUMMARY

In some embodiments, the present invention provides a mirror apparatus comprising a shatter-resistant mirror comprising: a thermoplastic polymeric layer; and a backing layer comprising: a first facing layer and a second facing layer; an open cell matrix positioned between said first and second facing layers, said open cell matrix comprising a plurality of open cells, wherein each open cell has an axis disposed perpendicular to the first facing layer and the second facing layer and cell walls circumferentially surrounding said axis; and wherein the backing layer has a stiffness sufficient to enable the shatter-resistant mirror to provide a substantially undistorted image.

Other embodiments of the present invention provide a mirror apparatus comprising a shatter-resistant mirror comprising: a thermoplastic polymeric layer; a facing layer; and a plurality of open cells positioned between the facing layer and the thermoplastic polymeric layer; each open cell having an axis disposed perpendicular to the facing layer and the thermoplastic polymeric layer; wherein the surface covering has a Young's Modulus sufficient to provide a substantially undistorted image.

Further embodiments provide methods of manufacturing any one of the mirror apparatus described herein.

BRIEF DESCRIPTION OF THE DRAWINGS

The present invention will become more fully understood from the detailed description and the accompanying drawings, wherein:

—FIG. 2 is not drawn to scale;

-FIG. 4 is not drawn to scale.

DETAILED DESCRIPTION

According to the present invention, the terms "substantially" and "about" refers to 3% of the referenced value. According to the present invention, the term "substantially free" refers to less than 0.05 wt. % based on total weight of the referenced composition.

Figure 1:
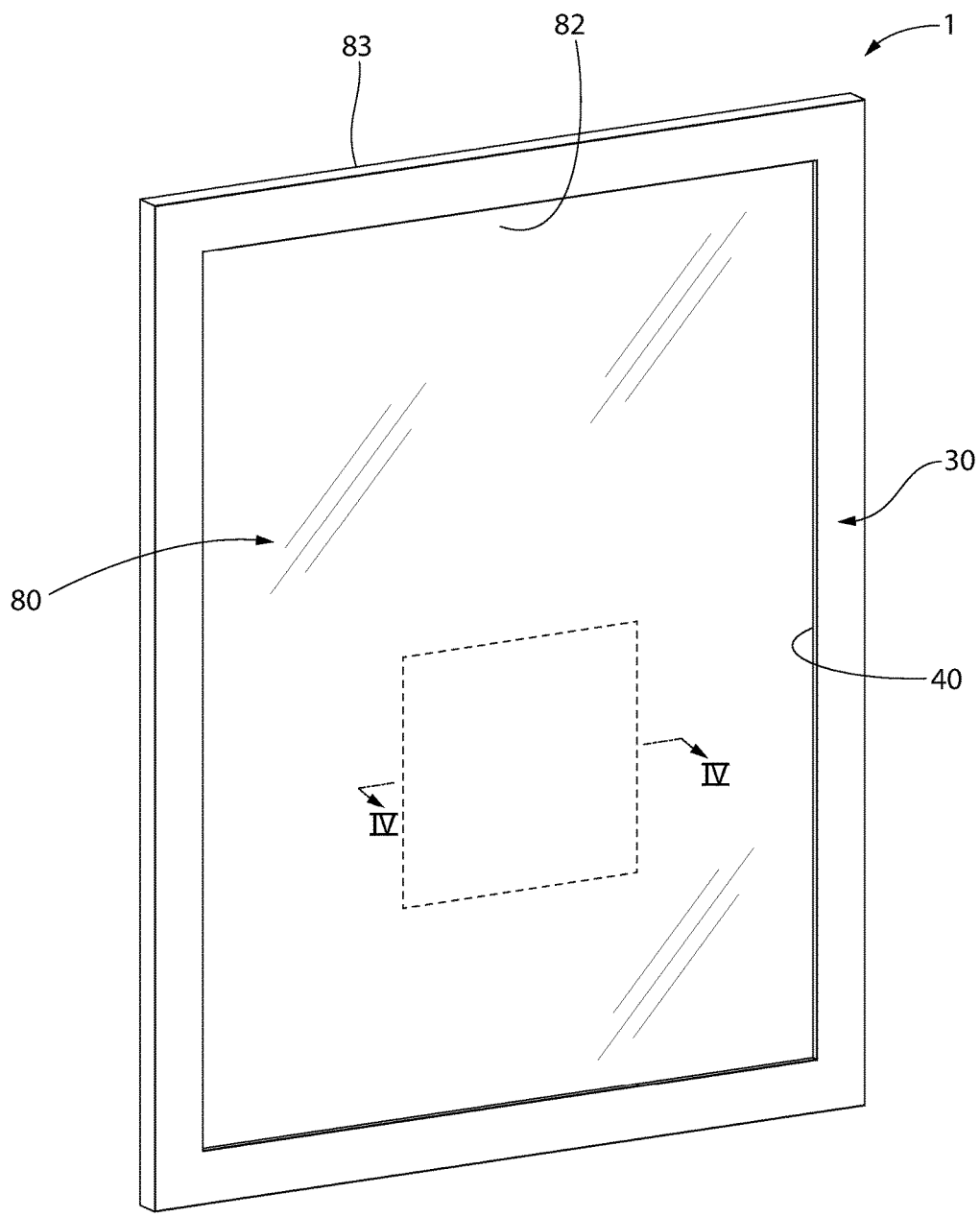
FIG. 1 is a front perspective view of a mirror apparatus 1 comprising a mirror according to the present invention.
Figure 4:
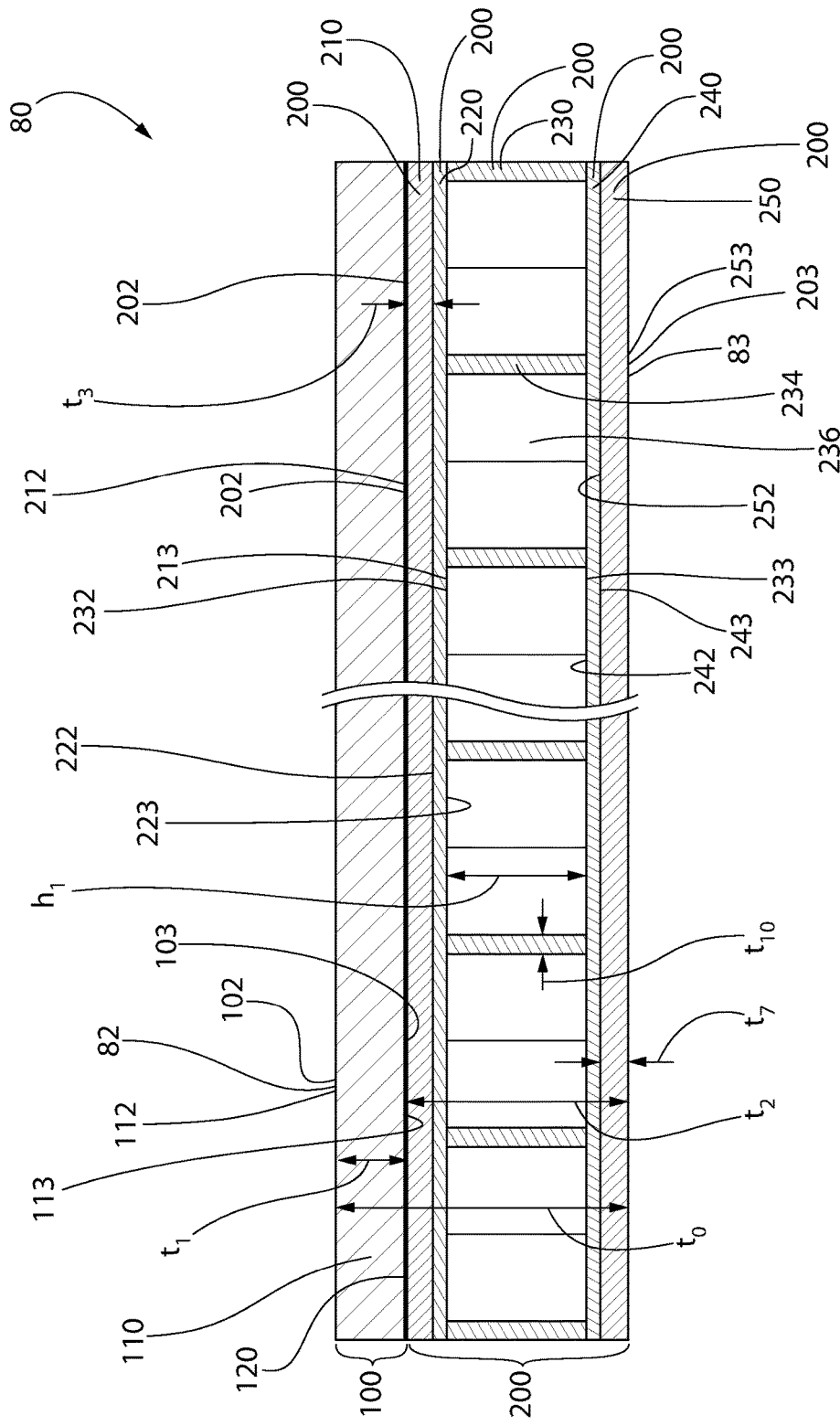
FIG. 4 is a cross-sectional view of a portion of the mirror according to embodiments of the present invention, the portion being identified by the dotted lines in FIG. 1 and the cross-sectional view is taken alone the III line set forth in FIG. 1

Referring to FIGS. 1 and 4 concurrently, a mirror apparatus 1 according to the present invention is disclosed. The mirror apparatus 1 generally comprises an annular frame 30 and a mirror 80. The annular frame 30 defines a central opening 40 and may be comprised of a polymeric material, a cellulosic material (e.g., wood), or a metallic material. The mirror 80 may be support within the annular frame 30. In other embodiments, the mirror apparatus 1 may frameless.

The mirror 80 of the present invention has a multi-layer structure that generally comprises a first major surface 82 opposite a second major surface 83. The multi-layer structure comprises a reflective substrate 100 and a backing layer 200.

Referring now to FIG. 4, the reflective substrate 100 may comprise an upper surface 102 opposite a lower surface 103. The reflective substrate 100 may have a thickness $t_1$ as measured from the upper surface 102 to the lower surface 103 of the reflective substrate 100. The thickness $t_1$ of the reflective substrate 100 may range from about 0.25 mm to about 2.5 mm—including all values and sub-ranges therebetween. In some embodiments, the thickness $t_1$ of the reflective substrate 100 may range from about 0.3 mm to about 2.25 mm—including all values and sub-ranges therebetween. In some embodiments, the thickness $t_1$ of the reflective substrate 100 may range from about 0.5 mm to about 2 mm—including all values and sub-ranges therebetween. In other embodiments, the thickness $t_1$ of the reflective substrate 100 may range from about 0.75 mm to about 1.75 mm—including all values and sub-ranges therebetween. In further embodiments, the thickness $t_1$ of the reflective substrate 100 may be about 1 mm.

The reflective substrate 100 may have a length $L_{RS}$ ranging from about 60 cm to about 160 cm—including all values and sub-ranges there-between. The reflective substrate 100 may have a width $W_{RS}$ ranging from about 25 cm to about 100 cm—including all values and sub-ranges there-between.

The reflective substrate 100 may comprise a transparent base layer 110 having an upper surface 112 opposite a lower surface 113 and a back coating 120 that is applied to the lower surface 113 of the transparent base layer 110. The upper surface 102 of the reflective substrate 100 may comprise the upper surface 112 of the transparent base layer 110 and the lower surface 103 of the reflective substrate 100 may comprise the back coating 120—i.e., the back coating 120 may directly contact the lower surface 113 of the transparent base layer 110. The back coating 120 may have a thickness that is sufficiently thin such that the resulting thickness $t_1$ of the reflective substrate 100 is substantially equal to the thickness of the transparent base layer 110. The back coating 120 may comprise a reflective material such as a silver-based composition or an aluminum-based composition.

The transparent base layer 110 may be formed from a polymeric material. The polymeric material may comprise a thermoplastic polymer. The thermoplastic polymer may be selected from one or more of polymethyl methacrylate (PMMA); polystyrene; polycarbonate; polyethylene terephthalate; and a combination of two or more thereof. In some embodiments, the transparent base layer 110 is formed from a thermoplastic polymer comprising polystyrene.

The transparent base layer 110 may be substantially clear. For the purposes of this application, the phrases "substantially clear" or "optically clear" refers to materials having an optical transmission of at least about 90%, or even higher, and a haze value of below about 5%, or even lower. The transparent base layer 110 should be substantially clear such that the underlying back coating 120 forms a reflective surface on the lower surface 113 of the transparent base layer 110 when viewed in a direction extending from at least the upper surface 102 towards the lower surface 103 of the reflective substrate 100. The transparent base layer 110 should be substantially clear such that the underlying back coating 120 forms a reflective surface when viewed from the first major surface 82 of the mirror 80. Stated otherwise, a viewer should see their reflection in the reflective surface when viewing the mirror 80 in the direction of the upper surface 102 towards the lower surface 103 of the reflective substrate 100.

Using a reflective substrate 100 comprising a transparent base layer 110 formed from a plastic material increases durability of the resulting mirror 80 by eliminating the risk of shattering that occurs when the transparent base layer is formed from a brittle material—such as glass. By using a polymeric material to form the transparent base layer 110 of the present invention, the resulting mirror 80 exhibits increased flexibility which translates to greater resistance to shattering when accidentally hit (e.g., by a child playing in his or her bedroom). The increase in shatter resistance creates drawbacks at certain reflective substrate 100 thicknesses due to the reduced rigidity of the plastic transparent base layer. With less rigidity, the transparent base layer is at greater risk to flexing, which causes distortion in the reflected image (e.g., a "fun house" mirror). Using a transparent base layer that has a greater thickness may somewhat reduce the amount of flexing in the reflective substrate, however, increasing the thicknesses of the transparent base layer is undesirable as it not only adds weight to the resulting mirror, but it also increases cost.

The present invention overcomes the problems associated with flexing, weight, and added material cost by coupling a rigid backing layer 200 to the thin reflective substrate 100, wherein the backing layer 200 provides additional structural rigidity to the overall mirror 80 without necessitating an increase in thickness $t_1$ to the reflective substrate 100. Furthermore, the backing layer 200 of the present invention is able to provide the additional structural integrity required to minimize flexing of the plastic-based reflective substrate 100 without adding a substantial amount of weight of the overall mirror 80—as discussed further herein.

The backing layer 200 may have a length $L_{BL}$ ranging from about 60 cm to about 160 cm including all values and sub-ranges there-between. The backing layer 200 may have a width $W_{BL}$ ranging from about 25 cm to about 100 cm—including all values and sub-ranges there-between.

The backing layer 200 of the present invention may be formed from a material such as a sheet of MDF, a sheet of HDF, corrugated plastic, corrugated cellulosic material, corrugated metal, or a combination of two or more thereof. In a preferred embodiment, the backing layer 200 is formed from a corrugated polymer and/or cellulosic material described further herein.

Figure 2:
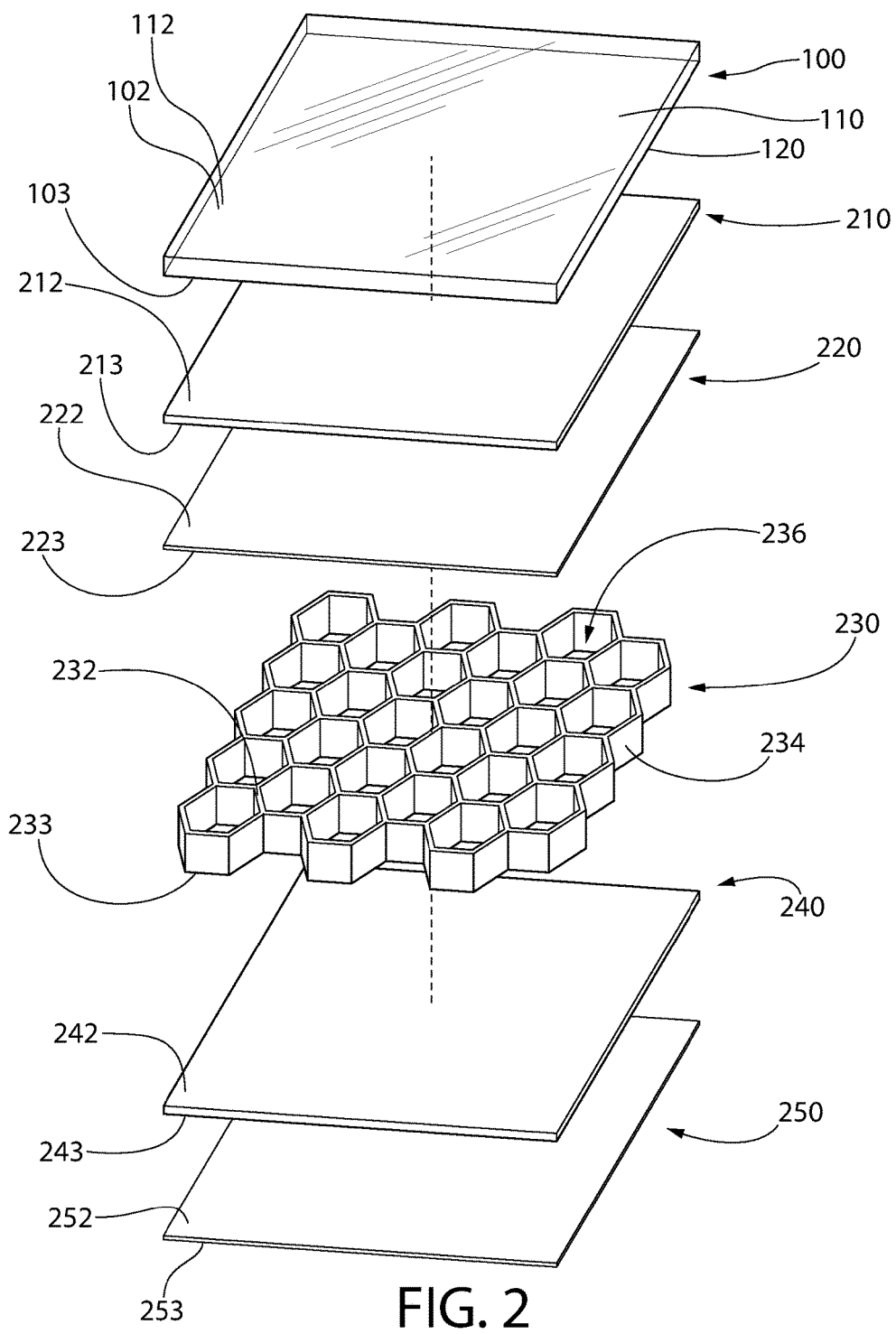
FIG. 2 is perspective view of the blown apart layers of the mirror according to the present invention
Figure 3:
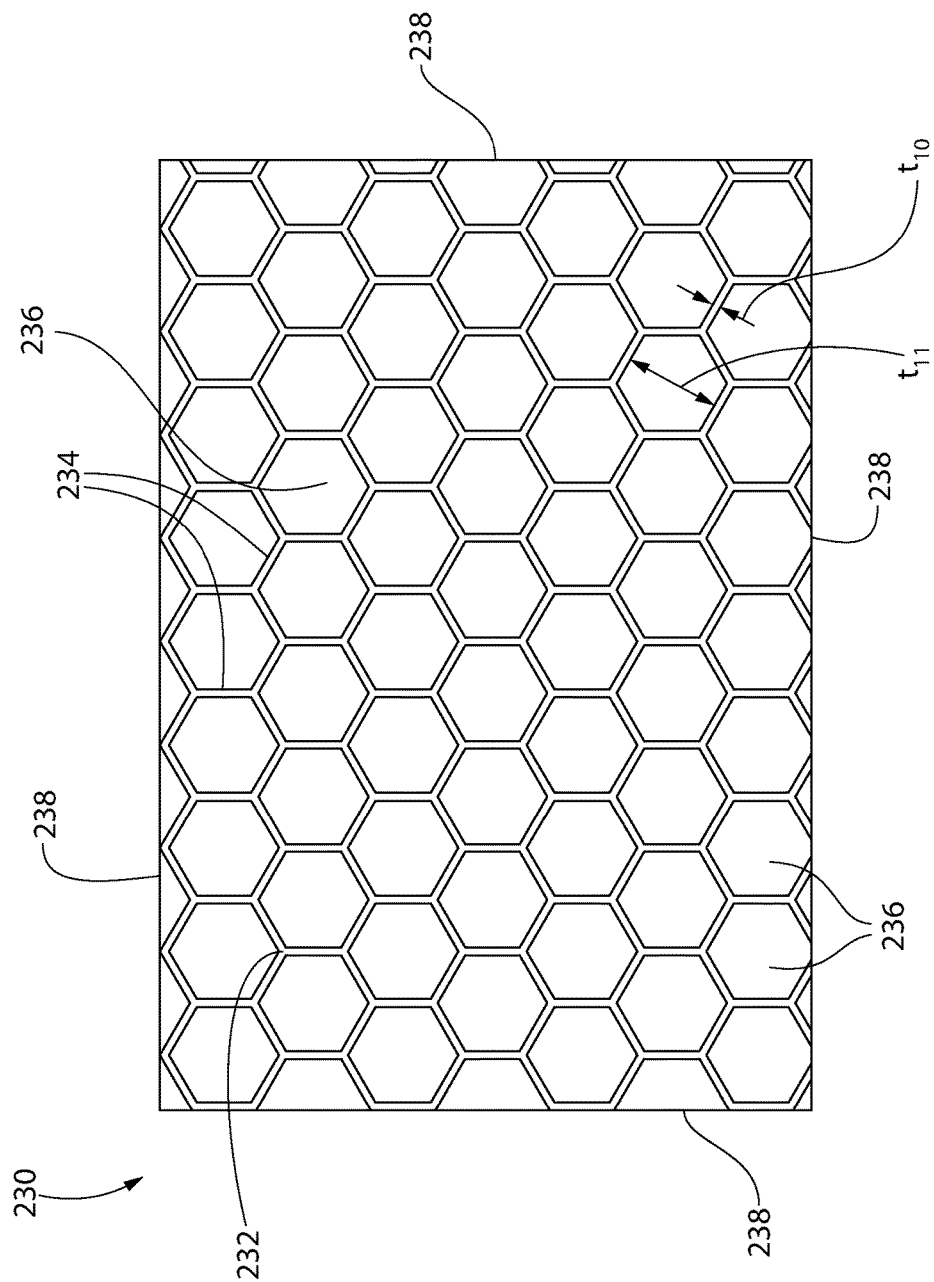
FIG. 3 is a top view of an open cell matrix layer according to the present invention.

Referring now to the embodiments illustrated by FIGS. 2-4, the backing layer 200 may comprise an upper surface 202 opposite a lower surface 203. The backing layer 200 may have a thickness $t_2$ as measured from the upper surface 202 to the lower surface 203 of the backing layer 200. The thickness $t_2$ of the backing layer 200 may range from about 5 mm to about 80 mm—including all values and sub-ranges there-between. The backing layer 200 may comprise at least a first facing layer 210, an open cell matrix 230, and a second facing layer 250, wherein the open cell matrix 230 is positioned between the first facing layer 210 and the second facing layer 250.

The first facing layer 210 may comprise an upper surface 212 opposite a lower surface 213. The first facing layer 210 may have a thickness $t_3$ as measured from the upper surface 212 to the lower surface 213 of the first facing layer 210. The thickness $t_3$ of the first facing layer 210 may range from about 0.1 mm to about 5.0 mm—including all values and sub-ranges there-between. The first facing layer 210 may have a length that is substantially equal to the length $L_{BL}$ of the backing layer 200. The first facing layer 210 may have a width that is substantially equal to the width $W_{BL}$ of the backing layer 200.

The first facing layer 210 may be formed from a cellulosic material, an inorganic material, a polymeric material, a metallic material, or a composite material thereof. A non-limiting example of a polymer/inorganic composite material may include lightweight fiberglass having glass fibers (inorganic material) embedded in a polymer matrix. A non-limiting example of a metal includes an aluminum sheet. In some embodiments, the first facing layer 210 is formed from a cellulosic material comprising kraft paper that may have a weight ranging from about 105 g/m² to about 170 g/m² weight kraft paper—including all values and sub-ranges there-between.

The second facing layer 250 may comprise an upper surface 252 opposite a lower surface 253. The second facing layer 250 may have a thickness $t_7$ as measured from the upper surface 252 to the lower surface 253 of the second facing layer 250. The thickness $t_7$ of the second facing layer 250 may range from about 0.1 mm to about 5.0 mm—including all values and sub-ranges there-between. The second facing layer 250 may have a length that is substantially equal to the length $L_{BL}$ of the backing layer 200. The second facing layer 250 may have a width that is substantially equal to the width $W_{BL}$ of the backing layer 200.

The second facing layer 250 may be formed from a cellulosic material, an inorganic material, a polymeric material, a metallic material, or a composite material thereof. A non-limiting example of a polymer/inorganic composite material includes lightweight fiberglass having glass fibers (inorganic material) embedded in a polymer matrix. A non-limiting example of a metal includes an aluminum sheet. In some embodiments, the second facing layer 250 is formed from a cellulosic material comprising kraft paper that may have a weight ranging from about 105 g/m² to about 170 g/m² weight kraft paper—including all values and sub-ranges there-between.

The open cell matrix 230 may comprise an upper surface 232 opposite a lower surface 233. The open call matrix 230 may have a height $h_1$ as measured from the upper surface 232 to the lower surface 233 of the open cell matrix 230. The height $h_1$ of the open cell matrix 230 may range from about 5 mm to about 100 mm—including all values and sub-ranges there-between.

Referring to FIGS. 2-4, the open cell matrix 230 may comprise a repeating pattern of open cells 236 formed from cell walls 234. Specifically, the cell walls 234 may be interconnected to form the plurality of open cells 236. The cell walls 234 may extend vertically in height between the lower surface 233 to the upper surface 232 of the open cell matrix 230 in a direction that is substantially perpendicular to upper surface 232 and the lower surface 234 of the open cell matrix 230. The upper surface 232 of the open cell matrix 230 may be defined by the tops of the cell walls 234 and the lower surface 233 of the open cell matrix 230 may be defined by the bottoms of the cell walls 234.

The cell walls 234 define cell openings 236 through the open cell matrix 230, which extend vertically through the base layer 200 and perpendicular to the upper surface 202 and the lower surface 203 of the base layer 200. The vertical orientation of the cell openings 236 is desirable and beneficial for both structural integrity of the resulting mirror 80 as well as reducing the weight and amount of material needed to manufacture the mirror 80. When joined to the first and second facing layers 210, 250, the open cell matrix 230 forms a structural member analogous to an I-beam construction having stiffness which resists deflection or sag in a direction acting along a vertical axis perpendicular to the first and second facing layers 210, 250 under the load of the reflective substrate 100. The cell walls may have a thickness $t_{10}$ ranging from about 0.1 mm to about 5 mm—including all values and sub-ranges there-between.

The cell walls 234 which define the cell openings 236 of the open cell matrix 230 may be formed from any number of thin, light, and porous or non-porous materials having sufficient stiffness that allows the reflective substrate 100 to resist to flexing when the mirror 80 is fully assembled—as discussed herein. In one embodiment, the open cell matrix 230 may be formed by of cell walls 234 formed from a cellulosic material, a polymer, a metal, or a combination thereof. A non-limiting example of a cellulosic material includes kraft paper. A non-limiting example of a polymeric material comprises thermoplastic polymer at least partially shaped into the open cell matrix 230 by extrusion. A non-limiting example of a metal includes an aluminum sheet.

Any suitable sizes cell 236 may be used for open cell matrix 230. In some preferred embodiments, cell width or diameter $t_{11}$ sizes forming the honeycomb structure may be from about 6 mm to about 30 mm—including all values and sub-ranges there-between—including all values and sub-ranges there-between (noting that the hexagon-shaped cells approximate a circle in shape and a diameter). Cell diameters beyond the foregoing range are suitable, but less desirable because issues may arise with surface deflection (pillowing), unsupported edge damage, and de-lamination.

In the illustrated embodiment of FIGS. 2-4, the open cell matrix 230 may be a honeycomb structure in configuration having a plurality of interconnected cell walls 234 that form a plurality of hexagonal open cells 236. However, the open cells 236 may be formed into any suitable shape (e.g. polygonal, circular, or other). Non-limiting examples of polygonal open cells 236 include triangular, square, rectangular, pentagonal, hexagonal, heptagonal, octagonal, trapezoidal.

The open cell matrix 230 forms a substantially open structure based on the three-dimensional total volume of the open cell matrix 230 delimited by the lateral sidewalls 238 and the upper and lower surfaces 232, 233 of the open cell matrix 230. In some embodiments, the open volume of the cells preferably may comprise about 60% or more of the total volume occupied by the open cell matrix 230. The open cell matrix 230 may comprise an open cell matrix density $(\rho_{OCM})$ that ranges from about 15 kg/m³ to about 40 kg/m³—including all values and sub-ranges there-between. The open cell matrix density may be calculated according to the following formula:

$$\rho_{OCM} = \text{Weight of Cell Walls/(Total Volume of Open Cell Matrix)}$$

Wherein the total volume of the open cell matrix 230 is the summation of the volume occupied by the cell walls 234 as well as the open cells 236 of the open cell matrix 230. The Total volume of the open cell matrix can be calculated according to the following formula:

$$\text{Total Volume of Open Cell Matrix} = L_{BL} \times W_{BL} \times h_1$$

Wherein $L_{BL}$ is the length of the backing layer 200 and $W_{BL}$ is the width of the backing layer 200—as previously discussed. The I-beam configuration of the first facing layer 210, second facing layer 250, and open cell matrix 230 provides structural integrity sufficient for the backing layer 200 to provide the requisite resistance to flexing of the reflective substrate 100 (as previously discussed) while also reducing the amount of material required per unit volume needed to from the backing layer 200—thereby providing a low-weight, cost effective mirror 80 that does not provide distorted reflections.

The backing layer 200 may be formed by bonding the first facing layer 210 to the upper surface 232 of the open cell matrix 230 with a first adhesive 220 and by bonding the second facing layer 250 to the lower surface 233 of the open cell matrix 230 with a second adhesive 240. The first and second adhesives 220, 240 may each independently be a discontinuous coating, a continuous coating, or a continuous film layer (as illustrated in FIGS. 2 and 3). The first adhesive 220 and the second adhesive 240 may each independently be selected from a pressure sensitive adhesive, a thermally activated adhesive, a hot-melt adhesive, or a combination thereof.

Specifically, the first adhesive 220 may be applied to at least one of the lower surface 213 of the first facing layer 210 or the upper surface 232 of the open cell matrix 230, follow by joining the lower surface 213 of the first facing layer 210 to the upper surface of the 232 open cell matrix 230 such that the first adhesive 220 is positioned between the first facing layer 210 and the open cell matrix 230. The second adhesive 220 may be applied to at least one of the upper surface 252 of the second facing layer 250 or the lower surface 233 of the open cell matrix 230, follow by joining the upper surface 252 of the second facing layer 250 to the lower surface of the 233 open cell matrix 230 such that the second adhesive 240 is positioned between the second facing layer 250 and the open cell matrix 230.

The amount of first and/or second adhesive 220, 240 used to bond the first and second facing layers 220, 240 to the open cell matrix 230 may be that which achieves a bond between the open cell matrix 230 and the first and second facing layers 210, 250 to produce sufficient peel strength. For the above described assembly, the failure point during a peel test is typically the internal cohesion of each the first and/or second facing layers 210, 250 itself. The first and second adhesive 220, 240 may be applied by roll coating, spray, dip coating or a combination of two or more thereof. In other embodiments, where the first and second adhesive layer 220, 240 are continuous films, the films may be laminated directly to at least one of the open cell matrix 230 or the first and/or second facing layers 210, 250.

After formation of the backing layer 200, the reflective substrate 100 may be adhesively bonded thereto. Specifically, a third adhesive (not pictured) may be applied to at least one of the lower surface 103 of the reflective substrate or the upper surface 202 of the backing layer 200. The third adhesive may be selected from a pressure sensitive adhesive, a thermally activated adhesive, a hot-melt adhesive, or a combination thereof.

The lower surface 103 of the reflective substrate 100 and the upper surface 202 of the backing layer 200 may then be brought together, thereby adhesively bonding backing layer 200 to the reflective substrate 100. The combination of first facing layer 210 and second facing layers 250 bonded to the open celled matrix 230 advantageously provides a lightweight backing layer 200 that sufficiently stiff for the reflective substrate 100 to resist flexing—thereby distorting reflections—without the need for heavy perimeter frames, thick transparent base layers, or heavy duty backing layers applied to the lower surface 103 of the reflective substrate 100 (such as MDF sheets) to provide additional support. Accordingly, the mirror 80 of the present invention may be frameless.

According to embodiments of the present invention, the mirror apparatus 1 of the present invention may comprise the annular frame 30 and the mirror 80, wherein the third adhesive that is present between the reflective substrate 100 and the backing layer 200 is applied within a perimeter zone. The adhesive may be applied to the perimeter zone by spray, roll coating, bead, or thin film lamination, followed by the lower surface 103 of the reflective substrate 100 and upper surface 202 of the backing layer 200 being brought together.

The perimeter zone exists between the lower surface 103 of the reflective substrate 100 and upper surface 202 of the backing layer of the mirror 80 and the perimeter zone is defined by the area of the mirror 80 that is concealed by the annular frame 30. The perimeter zone surrounds a center zone—the center zone being between the lower surface 103 of the reflective substrate 100 and upper surface 202 of the backing layer of the mirror 80 and the center zone being defined by the area inside of the perimeter zone—i.e. the area of the mirror 80 not concealed by the annular frame 30. The center zone is substantially free of adhesive.

According to other embodiments of the present invention, the mirror apparatus 1 of the present invention may comprise the mirror 80 and be frameless (i.e., no annular frame 30). In such embodiments, the third adhesive is a continuous layer of adhesive present between the reflective substrate 100 and the backing layer 200. Specifically, the third adhesive forms a substantially continuous layer between the lower surface 103 of the reflective substrate 100 and upper surface 202 of the backing layer 200 of the mirror 80. The third adhesive may be a separate continuous film that is positioned between the lacking layer 200 and the reflective substrate 100. The third adhesive may also be applied to at least one of the lower surface 103 of the reflective substrate 100 or upper surface 202 of the backing layer 200 by spray, roll coating, dip coating, or the like to form a substantially continuous layer of adhesive, where the lower surface 103 of the reflective substrate 100 and upper surface 202 of the backing layer 200 are then brought together.

As those skilled in the art will appreciate, numerous changes and modifications may be made to the embodiments described herein, without departing from the spirit of the invention. It is intended that all such variations fall within the scope of the invention.

The invention claimed is:

1. A mirror apparatus comprising a shatter-resistant mirror comprising:
   a reflective layer comprising thermoplastic polymer; and
   a backing layer that is flat, the backing layer comprising:
      a first facing layer and a second facing layer;
      an open cell matrix positioned between said first and second facing layers, said open cell matrix comprising a plurality of open cells, wherein each open cell has an axis disposed perpendicular to the first facing layer and the second facing layer and cell walls circumferentially surrounding said axis; and
   wherein the reflective layer and the backing layer are coupled together, and the backing layer has a stiffness sufficient to enable the shatter-resistant mirror to provide a substantially undistorted image produced by the reflective layer.

2. The mirror apparatus according to claim 1, wherein the thermoplastic polymeric layer comprises a material selected from: poly methyl methacrylate; polystyrene; polycarbonate; polyethylene terephthalate; and a combination of two or more thereof.

3. The mirror apparatus according to claim 1, wherein the open cell matrix is formed from a cellulosic material, a polymer, a metal or a combination thereof.

4. The mirror apparatus according to claim 1, wherein the open cells are polygonal.

5. The mirror apparatus according to claim 1, wherein the open cells are triangular, square, rectangular, pentagonal, hexagonal, heptagonal or octagonal.

6. The mirror apparatus according to claim 1, wherein the backing layer further comprises an adhesive layer.

7. The mirror apparatus according to claim 6, wherein an adhesive layer is present between the open cell matrix and the first facing layer.

8. The mirror apparatus according to claim 6, wherein an adhesive layer is present between the open cell matrix and the second facing layer.

9. The mirror apparatus according to claim 6, wherein an adhesive layer is present between the open cell matrix and the first facing layer, and the open cell matrix and the second facing layer.

10. The mirror apparatus according to claim 6, wherein the adhesive layer comprises a pressure sensitive adhesive, a thermally activated adhesive, a hot melt adhesive, or a combination thereof.

11. The mirror apparatus according to claim 1, wherein the first facing layer and second facing layer comprise a cellulosic material, a polymer, a metal or a combination thereof.

12. The mirror apparatus according to claim 1, wherein the thermoplastic polymeric layer has a thickness of from about 0.5 mm to about 2 mm.

13. The mirror apparatus according to claim 1, wherein the thermoplastic polymeric layer has a thickness of about 1 mm.

14. The mirror apparatus according to claim 1, wherein the cell walls of the open cells have a height and a thickness that provide sufficient stiffness to the backing layer.

15. The mirror apparatus according to claim 1, wherein the cell walls of the open cells have a thickness of from about 0.25 inch to about 0.5 inch.

16. The mirror apparatus according to claim 1, wherein the open cells have a volume that provides sufficient stiffness to the backing layer.

17. The mirror apparatus according to claim 3, wherein the open cell matrix is formed by an extrusion process, and wherein the open cell matrix comprises a polymer.

18. A mirror apparatus comprising a shatter-resistant mirror comprising:
- a transparent thermoplastic polymeric layer;
- a surface covering comprising:
  - a facing layer; and
  - a plurality of open cells positioned between the facing layer and the thermoplastic polymeric layer; each open cell having an axis disposed perpendicular to the facing layer and the thermoplastic polymeric layer;
- wherein the surface covering has a Young's Modulus sufficient to provide a substantially undistorted image.

19. A mirror apparatus comprising:
- a reflective layer having a first major surface opposite a second major surface, the reflective layer comprising:
  - a base layer having an upper surface opposite a lower surface, the substrate being substantially transparent and comprising thermoplastic polymer; and
  - a reflective material applied to the lower surface of the substrate layer;
  - whereby the first major surface of the reflective layer comprises the upper surface of the substrate layer and the second major surface of the reflective layer comprises the reflective material;
- a backing layer having a first major surface opposite a second major surface, the backing layer comprising:
  - a first facing layer and a second facing layer;
  - an open cell matrix positioned between said first and second facing layers, said open cell matrix comprising a plurality of open cells, wherein each open cell has an axis disposed perpendicular to the first facing layer and the second facing layer and cell walls circumferentially surrounding said axis;
  - whereby the first major surface of the backing layer comprises the first facing layer and the second major surface of the backing layer comprises the second facing layer;
- wherein the second major surface of the reflective layer faces the first major surface of the backing layer.

20. The mirror apparatus according to claim 18, wherein the second major surface of the reflective layer is adhesively bonded to the first major surface of the backing layer.

* * * * *